United States Patent
Kleidon

(10) Patent No.: US 12,059,837 B1
(45) Date of Patent: Aug. 13, 2024

(54) SYSTEMS, METHODS, AND COMPOSITIONS FOR THREE-DIMENSIONAL PRINTING USING HEMP

(71) Applicant: Ojai Energetics PBC, Ojai, CA (US)

(72) Inventor: William Kleidon, Ojai, CA (US)

(73) Assignee: Ojai Energetics PBC, Ojai, CA (US)

( * ) Notice: Subject to any disclaimer, the term of this patent is extended or adjusted under 35 U.S.C. 154(b) by 46 days.

(21) Appl. No.: 17/363,081

(22) Filed: Jun. 30, 2021

Related U.S. Application Data

(60) Provisional application No. 63/047,107, filed on Jul. 1, 2020.

(51) Int. Cl.

| | | |
|---|---|---|
| B29C 64/106 | (2017.01) | |
| B29C 64/209 | (2017.01) | |
| B29C 64/245 | (2017.01) | |
| B29L 31/60 | (2006.01) | |
| B33Y 10/00 | (2015.01) | |
| B33Y 30/00 | (2015.01) | |
| B33Y 70/00 | (2020.01) | |
| B33Y 80/00 | (2015.01) | |
| E04G 5/00 | (2006.01) | |
| B29K 303/08 | (2006.01) | |

(52) U.S. Cl.
CPC .......... *B29C 64/106* (2017.08); *B29C 64/209* (2017.08); *B29C 64/245* (2017.08); *B33Y 10/00* (2014.12); *B33Y 30/00* (2014.12); *B33Y 70/00* (2014.12); *B33Y 80/00* (2014.12); *E04G 5/007* (2013.01); *B29K 2303/08* (2013.01); *B29L 2031/608* (2013.01)

(58) Field of Classification Search
CPC ......... B28B 1/001; B33Y 10/00; B33Y 70/00; B33Y 80/00; B33Y 30/00; E04G 21/0463; E04G 5/007; B29C 64/106; B29C 64/209; B29C 64/245
See application file for complete search history.

(56) References Cited

U.S. PATENT DOCUMENTS

| | | |
|---|---|---|
| 6,913,644 B2 | 7/2005 | Rizza |
| 9,511,543 B2 | 12/2016 | Tyler |
| 2003/0066262 A1 | 4/2003 | Putnam |

(Continued)

FOREIGN PATENT DOCUMENTS

| | | |
|---|---|---|
| EP | 0980936 B1 | 4/2004 |
| WO | WO-2016058097 A1 | 4/2016 |

(Continued)

OTHER PUBLICATIONS

Del Zotto Products. How Self-Healing Concrete Works. Accessed online Jan. 26, 2021. https://delzottoproducts.com/2015/02/04/self-healing-concrete-works/ (2 pages).

(Continued)

*Primary Examiner* — Jerzi H Moreno Hernandez
(74) *Attorney, Agent, or Firm* — Greenberg Traurig, LLP

(57) ABSTRACT

Provided herein are methods for using hempcrete. In some instances, the present disclosure provides methods for 3D printing hempcrete. The 3D printed hempcrete may be printed in tandem with other materials, including hemp-based plastics. Hempcrete formulation may be 3D printed to form a building scaffolding.

10 Claims, 5 Drawing Sheets

(56) References Cited

U.S. PATENT DOCUMENTS

| | | |
|---|---|---|
| 2014/0061974 A1 | 3/2014 | Tyler |
| 2016/0002468 A1 | 1/2016 | Heikkila et al. |
| 2016/0263822 A1* | 9/2016 | Boyd, IV ................ B28B 1/008 |
| 2017/0129133 A1* | 5/2017 | Bolivar .................... B28B 1/00 |
| 2017/0140848 A1 | 5/2017 | Abidi et al. |
| 2018/0118902 A1* | 5/2018 | Milazzo .................. C08L 67/02 |
| 2019/0248987 A1* | 8/2019 | Moolman ................ C04B 28/10 |
| 2019/0264453 A1* | 8/2019 | Petri ........................ E04G 11/04 |
| 2020/0157012 A1 | 5/2020 | Metten et al. |
| 2021/0078200 A1* | 3/2021 | Tinari .................... B29C 64/227 |
| 2023/0139941 A1* | 5/2023 | Srubar, III ............ C04B 18/248 |
| | | 106/790 |

FOREIGN PATENT DOCUMENTS

| | | |
|---|---|---|
| WO | WO-2016105945 A1 | 6/2016 |
| WO | WO-2016157151 A1 | 10/2016 |
| WO | WO-2018202842 A1 * | 11/2018 ............. B28B 1/001 |

OTHER PUBLICATIONS

HEMPME. The Ultimate Guide to Hempcrete: An Eco-Friendly Alternative to Concrete. Accessed online Apr. 20, 2020. https://www.hempme.com.au/ultimate-hempcrete-guide/ (8 pages).

Snoeck, et al. Self-healing of concrete. Ghent University. Department of Structural Engineering and Building Materials. Accessed online Aug. 4, 2021. https://www.ugent.be/ea/structural-engineering/en/research/magnel/research/research3/selfhealing (3 pages).

Wikipedia. Hempcrete. Last edited Sep. 20, 2021. https://en.wikipedia.org/wiki/Hempcrete (3 pages).

* cited by examiner

SYSTEMS, METHODS, AND COMPOSITIONS FOR THREE-DIMENSIONAL PRINTING USING HEMP

CROSS-REFERENCE

This application claims the benefit of U.S. Provisional Application No. 63/047,107, filed on Jul. 1, 2020, which is incorporated herein by reference in its entirety.

BACKGROUND

Concrete can be a mixture of a plurality of materials (e.g., stone, cerement, water, etc.) usable as a building material for roads, buildings, etc. Concrete manufacture can be an expensive, resource intensive process, and can be a major contributor to global greenhouse emissions and waste generation.

SUMMARY

There is considerable, unmet need for modification of or an alternative building materials to concrete (e.g., a cheaper and/or more environmentally friendly building materials). In some aspects, the present disclosure provides hempcrete formulations with low carbon dioxide ($CO_2$) footprints and/or favorable structural properties. The present disclosure provides hempcrete compositions, which may be used in the manufacture of building and structural support materials. The hempcrete formulations of the present disclosure can comprise a wide range of physical and/or chemical properties, and thus can be tailored for a large number of uses (e.g., a plurality of different uses). The hempcrete may be capable of self-healing, and/or may comprise low environmental impact binder or alternatively sourced lime. In some aspects, the present disclosure provides methods for using hempcrete in three-dimensional (3D) printing.

Some aspects of the present disclosure provide methods for using hempcrete. In some aspects, the present disclosure provides methods for 3D printing hempcrete. The 3D printed hempcrete may be printed in tandem with other materials, including hemp-based plastics.

In an aspect, the present disclosure provides a method comprising three-dimensional (3D) printing a scaffolding of a building using hempcrete.

In some embodiments, the 3D printing comprises 3D printing an additional material. In some embodiments, the additional material is printed prior to the 3D printing of the hempcrete. In some embodiments of any one of the methods disclosed herein, the hempcrete is 3D printed adjacent to and in contact with the additional material. In some embodiments of any one of the methods disclosed herein, the additional material is a plastic. In some embodiments of any one of the methods disclosed herein, the plastic comprises a hemp-based plastic.

In some embodiments of any one of the methods disclosed herein, the method further comprises, subsequent to the 3D printing of the scaffolding, removing at least a portion of the 3D-printed additional material.

In some embodiments of any one of the methods disclosed herein, an amount of hemp or a derivative thereof in the hempcrete is at least about 5% of the hempcrete. In some embodiments of any one of the methods disclosed herein, an amount of hemp or a derivative thereof in the hempcrete is at least about 10% of the hempcrete. In some embodiments of any one of the methods disclosed herein, an amount of hemp or a derivative thereof in the hempcrete is at least about 20% of the hempcrete.

In some embodiments of any one of the methods disclosed herein, the 3D printing comprises depositing a hempcrete formulation configured to form the hempcrete.

In some embodiments of any one of the methods disclosed herein, subsequent to the printing, the hempcrete sequesters a greater amount of carbon dioxide ($CO_2$) than an amount of $CO_2$ generated during manufacturing of the hempcrete formulation. In some embodiments, the amount of $CO_2$ that is sequestered by the hempcrete is greater than the amount of $CO_2$ that is generated during the manufacturing of the hempcrete formulation by at least about 5%. In some embodiments, the amount of $CO_2$ that is sequestered by the hempcrete is greater than the amount of $CO_2$ that is generated during the manufacturing of the hempcrete formulation by at least about 10%.

In some embodiments of any one of the methods disclosed herein, the method further comprises producing the hempcrete formulation within a 3D printer, wherein the 3D printer is configured to perform the 3D printing.

In some embodiments of any one of the methods disclosed herein, the scaffolding comprises a honeycomb structure.

In another aspect, the present disclosure provides a system for three-dimensional (3D) printing, comprising: (i) a print head in fluid communication with a source of a hempcrete formulation; (ii) a platform configured to hold an amount of the hempcrete formulation; and (iii) a controller configured to direct the print head to deposit the amount of the hempcrete formulation adjacent to the platform, to print at least a portion of a scaffolding of a building.

In some embodiments, the controller is further configured to direct the print head or an additional print head to deposit an amount of an additional material to the platform prior to the deposition of the amount of the hempcrete formulation.

In some embodiments of any one of the systems disclosed herein, the additional material is hemp-based plastic.

In some embodiments of any one of the systems disclosed herein, the scaffolding comprises a honeycomb structure.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
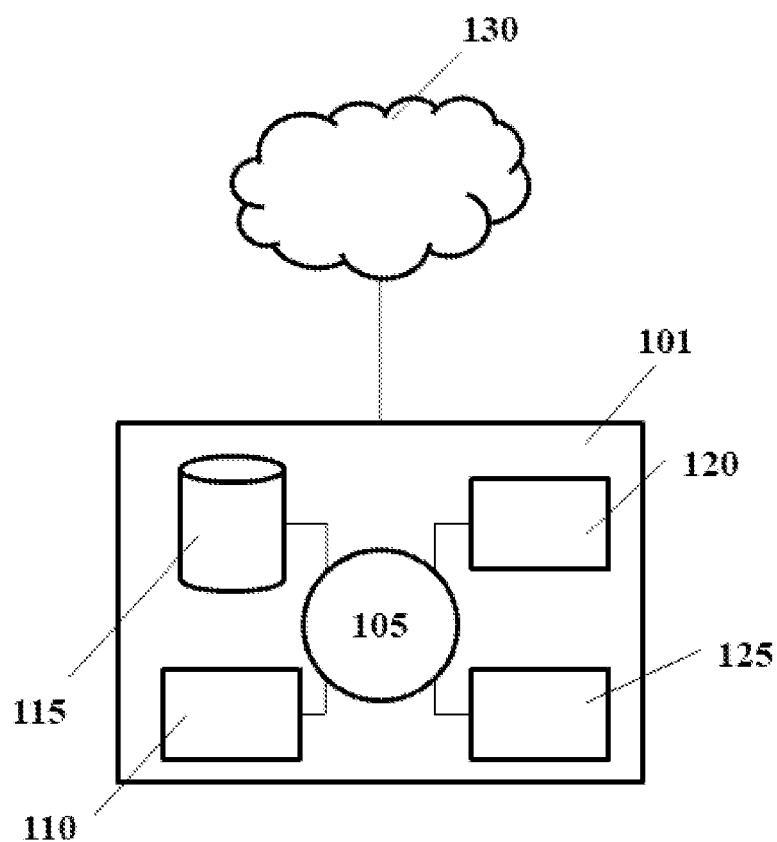
FIG. 1 shows a computer control system that is programmed or otherwise configured to implement methods provided herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The term "about" or "nearly" as used interchangeably herein refers to within +/−10%, 9%, 8%, 7%, 6%, 5%, 4%, 3%, 2%, or 1% of a designated value (e.g., a designated amount).

Compositions

The present disclosure provides hempcrete formulations. As used herein, the term "hempcrete" or "hemp concrete," as used interchangeably herein, generally refers to a material that comprises a hemp-sourced component and a binder. Hemp has a number of properties that allows it to effectively combine with certain binders to form materials with desirable properties. For example, some hemps form silicate aggregates with non-hydraulic cements, and thus combine to yield stable, high strength materials.

Hemp may refer, but is not limited, to any material derived from any member of the family Cannabacae. For example, hemp may refer to a material derived from a member of the genera Cannabacae *Aphananthe*, Cannabacae *Celtis*, Cannabacae *Trema*, Cannabacae *Cannabis*, Cannabacae *Gironniera*, Cannabacae *Humulus*, Cannabacae *Parasponia*, or Cannabacae *Pteroceltis*. In some cases, a hempcrete formulation may comprise hemp derived from *Cannabis sativa*. In some cases, a hempcrete formulation may comprise hemp derived from *Cannabis ruderalis*. In some cases, a hempcrete formulation may comprise hemp derived from *Cannabis indica*. Appreciating the differences in chemical and physical properties among the various hemp strains, the present disclosure provides hempcrete formulations with hemp derived from multiple different strains.

Hemp material may be derived from any part of a hemp plant. In some cases, hemp material comprises material derived from a leaf. In some cases, hemp material comprises material derived from a stem. In some cases, hemp material comprises material derived from a flower. In some cases, hemp material comprises material derived from a stalk. In some cases, hemp material comprises material derived from hemp hurd. In some cases, hemp material comprises material comprises bast fibers. In some cases, hemp material comprises material derived from hemp roots. In some cases, hemp material comprises material derived from hemp that has undergone cannabinoid extraction.

In some cases, a hemp material may undergo processing prior to being added to a hempcrete formulation. Such processing may comprise biological processing. In some cases, a hemp material may be fermented or aerobically digested. In some cases, lignin from the hemp plant may be digested (e.g., the hemp may be retted) or otherwise removed. In some cases, hemp may be treated with enzymes.

In some cases, a hemp material may be chemically or mechanically treated prior to being added to a hempcrete formulation. In some cases, the hemp may be mechanically treated. For example, hemp material may be milled, ground, fibrillated, calendered, or any combination thereof. In some cases, the hemp may be cooked, pyrolyzed, singed, mineralized, frozen, desiccated, hydrated, or any combination thereof. In some cases, the hemp may be chemically treated. For example, the hemp may be bleached, acid-washed, base-washed, dyed, halogenated, acetylated, sulfonated, combined with a preservative (e.g., treated with chromated copper arsenate), or any combination thereof. In some cases, woody material (e.g., bast fibers) may be separated from other hemp components.

A hempcrete formulation of the present disclosure may comprise a content of hemp or its derivative. Non-limiting examples of a hemp derivate may include fibers (e.g., bast or hurd fibers), powders (e.g., bast or hurd powders), particles (e.g., microcrystalline cellulose (MCC) particles, nanocrystalline cellulose (NCC) particles, graphite flakes, graphene-like carbon nanosheets, etc.), etc. For example, a hemp-derived particle may have an average dimension (e.g., an average diameter, an average length) of at least about 0.1 micrometer (μm), 0.2 μm, 0.5 μm, 0.8 μm, 1 μm, 2 μm, 5 μm, 8 μm, 10 μm, 20 μm, 50 μm, 80 μm, 100 μm, 200 μm, 500 μm, 800 μm, or more. A hemp-derived particle may have a diameter of at most about 1000 μm, 800 μm, 500 μm, 200 μm, 100 μm, 80 μm, 50 μm, 20 μm, 10 μm, 8 μm, 5 μm, 2 μm, 1 μm, 0.8 μm, 0.5 μm, 0.2 μm, 0.1 μm, or less.

A hempcrete formulation of the present disclosure may comprise hemp or its derivative in an amount of at least about 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95%, or more of the hempcrete formulation by weight. The amount of hemp or its derivative in the hempcrete formulation may be at most about 95%, 90%, 85%, 80%, 75%, 70%, 65%, 60%, 55%, 50%, 45%, 40%, 35%, 30%, 25%, 20%, 15%, 10%, 5%, 1%, 0.5%, 0.1%, or less of the hempcrete formulation by weight. The amount of hemp or its derivative in the hempcrete formulation may be at least about 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95%, or more of the hempcrete formulation by volume. The amount of hemp or its derivative in the hempcrete formulation may be at most about 95%, 90%, 85%, 80%, 75%, 70%, 65%, 60%, 55%, 50%, 45%, 40%, 35%, 30%, 25%, 20%, 15%, 10%, 5%, 1%, 0.5%, 0.1%, or less of the hempcrete formulation by volume.

Hempcrete formulations of the present disclosure may comprise a wide range of aggregate materials, including, but are not limited to, sand, gravel, crushed stone, nanocomposite materials, glass, minerals, crystalline materials, polymers, salts, ash, and metal oxides, cellulosic materials, recycled concrete, or any combination thereof.

An amount of one or more aggregate materials in the hempcrete formulation of the present disclosure may be at least about 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95%, or more of the hempcrete formulation by weight. The amount of one or more aggregate materials in the hempcrete formulation may be at most about 95%, 90%, 85%, 80%, 75%, 70%, 65%, 60%, 55%, 50%, 45%, 40%, 35%, 30%, 25%, 20%, 15%, 10%, 5%, 1%, 0.5%, 0.1%, or less of the hempcrete formulation by weight. The amount of one or more aggregate materials in the hempcrete formulation may be at least about 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95%, or more of the hempcrete formulation by volume. The amount of one or more aggregate materials in the hempcrete formulation may be at most about 95%, 90%, 85%, 80%, 75%, 70%, 65%, 60%, 55%, 50%, 45%, 40%, 35%, 30%, 25%, 20%, 15%, 10%, 5%, 1%, 0.5%, 0.1%, or less of the hempcrete formulation by volume.

In some examples, the amount of hemp or its derivative in the hempcrete formulation may be greater than the amount of one or more aggregate materials in the hempcrete formulation by at least about 0.1%, 0.5%, 1%, 5%, 10%, 15%, 20%, 25%, 30%, 35%, 40%, 45%, 50%, 55%, 60%, 65%, 70%, 75%, 80%, or more by weight of the hempcrete formulation. The amount of hemp or its derivative in the hempcrete formulation may be greater than the amount of one or more aggregate materials in the hempcrete formulation by at most about 80%, 75%, 70%, 65%, 60%, 55%, 50%, 45%, 40%, 35%, 30%, 25%, 20%, 15%, 10%, 5%, 1%, 0.5%, 0.1%, or less or more by weight of the hempcrete formulation. The amount of hemp or its derivative in the hempcrete formulation may be greater than the amount of one or more aggregate materials in the hempcrete formulation by at least about 0.1%, 0.5%, 1%, 5%, 10%, 15%, 20%, 25%, 30%, 35%, 40%, 45%, 50%, 55%, 60%, 65%, 70%, 75%, 80%, or more by volume of the hempcrete formulation. The amount of hemp or its derivative in the hempcrete formulation may be greater than the amount of one or more aggregate materials in the hempcrete formulation by at most about 80%, 75%, 70%, 65%, 60%, 55%, 50%, 45%, 40%, 35%, 30%, 25%, 20%, 15%, 10%, 5%, 1%, 0.5%, 0.1%, or less or more by volume of the hempcrete formulation.

In some examples, the amount of hemp or its derivative in the hempcrete formulation may be less than the amount of one or more aggregate materials in the hempcrete formulation by at least about 0.1%, 0.5%, 1%, 5%, 10%, 15%, 20%, 25%, 30%, 35%, 40%, 45%, 50%, 55%, 60%, 65%, 70%, 75%, 80%, or more by weight of the hempcrete formulation. The amount of hemp or its derivative in the hempcrete formulation may be less than the amount of one or more aggregate materials in the hempcrete formulation by at most about 80%, 75%, 70%, 65%, 60%, 55%, 50%, 45%, 40%, 35%, 30%, 25%, 20%, 15%, 10%, 5%, 1%, 0.5%, 0.1%, or less or more by weight of the hempcrete formulation. The amount of hemp or its derivative in the hempcrete formulation may be less than the amount of one or more aggregate materials in the hempcrete formulation by at least about 0.1%, 0.5%, 1%, 5%, 10%, 15%, 20%, 25%, 30%, 35%, 40%, 45%, 50%, 55%, 60%, 65%, 70%, 75%, 80%, or more by volume of the hempcrete formulation. The amount of hemp or its derivative in the hempcrete formulation may be less than the amount of one or more aggregate materials in the hempcrete formulation by at most about 80%, 75%, 70%, 65%, 60%, 55%, 50%, 45%, 40%, 35%, 30%, 25%, 20%, 15%, 10%, 5%, 1%, 0.5%, 0.1%, or less or more by volume of the hempcrete formulation.

In some examples, the amount of hemp or its derivative in the hempcrete formulation may be substantially the same as the amount of one or more aggregate materials in the hempcrete formulation.

Hempcrete formulations of the present disclosure may comprise one or more additional materials, such as, for example, binders (e.g., silicate, oxide, cementitious materials, etc.), hempcrete hardening agents, corrosion inhibitors, plasticizers, additives, etc.). Hempcrete formulations of the present disclosure may comprise a wide range of binders. Hempcrete may comprise a silicate or oxide, including CaO, MgO, NaOH, KOH, Ca(OH)$_2$, alite, belite, celite, brownmillerite, aluminate, silicate, titanium dioxide, or any combination thereof. For example, a binder of the hempcrete formulation as disclosed herein Hempcrete compositions may comprise cementitious materials, including but not limited to ash, pozzolans, diatomaceous earth clays and powders, silicic acid, iron oxides, sulfur oxides, and any combination thereof. Hempcrete formulations may comprise materials that increase or decrease the rate at which the hempcrete hardens. Hempcrete formulations may comprise corrosion inhibitors, such as calcium nitrate. Hempcrete formulations may comprise plasticizers, such as lignosulfonate. Hempcrete formulations may comprise additives that promote the formation of pores or capillaries.

An amount of the one or more additional materials in the hempcrete formulation of the present disclosure may be at least about 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95%, or more of the hempcrete formulation by weight. The amount of the one or more additional materials in the hempcrete formulation may be at most about 95%, 90%, 85%, 80%, 75%, 70%, 65%, 60%, 55%, 50%, 45%, 40%, 35%, 30%, 25%, 20%, 15%, 10%, 5%, 1%, 0.5%, 0.1%, or less of the hempcrete formulation by weight. The amount of the one or more additional materials in the hempcrete formulation may be at least about 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95%, or more of the hempcrete formulation by volume. The amount of the one or more additional materials in the hempcrete formulation may be at most about 95%, 90%, 85%, 80%, 75%, 70%, 65%, 60%, 55%, 50%, 45%, 40%, 35%, 30%, 25%, 20%, 15%, 10%, 5%, 1%, 0.5%, 0.1%, or less of the hempcrete formulation by volume.

In some examples, the amount of hemp or its derivative in the hempcrete formulation may be greater than the amount of the one or more additional materials in the hempcrete formulation by at least about 0.1%, 0.5%, 1%, 5%, 10%, 15%, 20%, 25%, 30%, 35%, 40%, 45%, 50%, 55%, 60%, 65%, 70%, 75%, 80%, or more by weight of the hempcrete formulation. The amount of hemp or its derivative in the hempcrete formulation may be greater than the amount of the one or more additional materials in the hempcrete formulation by at most about 80%, 75%, 70%, 65%, 60%, 55%, 50%, 45%, 40%, 35%, 30%, 25%, 20%, 15%, 10%, 5%, 1%, 0.5%, 0.1%, or less or more by weight of the hempcrete formulation. The amount of hemp or its derivative in the hempcrete formulation may be greater than the amount of the one or more additional materials in the hempcrete formulation by at least about 0.1%, 0.5%, 1%, 5%, 10%, 15%, 20%, 25%, 30%, 35%, 40%, 45%, 50%, 55%, 60%, 65%, 70%, 75%, 80%, or more by volume of the hempcrete formulation. The amount of hemp or its derivative in the hempcrete formulation may be greater than the amount of the one or more additional materials in the hempcrete formulation by at most about 80%, 75%, 70%, 65%, 60%, 55%, 50%, 45%, 40%, 35%, 30%, 25%, 20%, 15%, 10%, 5%, 1%, 0.5%, 0.1%, or less or more by volume of the hempcrete formulation.

In some examples, the amount of hemp or its derivative in the hempcrete formulation may be less than the amount of the one or more additional materials in the hempcrete formulation by at least about 0.1%, 0.5%, 1%, 5%, 10%, 15%, 20%, 25%, 30%, 35%, 40%, 45%, 50%, 55%, 60%, 65%, 70%, 75%, 80%, or more by weight of the hempcrete formulation. The amount of hemp or its derivative in the hempcrete formulation may be less than the amount of the one or more additional materials in the hempcrete formulation by at most about 80%, 75%, 70%, 65%, 60%, 55%, 50%, 45%, 40%, 35%, 30%, 25%, 20%, 15%, 10%, 5%, 1%, 0.5%, 0.1%, or less or more by weight of the hempcrete formulation. The amount of hemp or its derivative in the hempcrete formulation may be less than the amount of the one or more additional materials in the hempcrete formulation by at least about 0.1%, 0.5%, 1%, 5%, 10%, 15%, 20%, 25%, 30%, 35%, 40%, 45%, 50%, 55%, 60%, 65%, 70%, 75%, 80%, or more by volume of the hempcrete formulation. The amount of hemp or its derivative in the hempcrete formulation may be less than the amount of the one or more additional materials in the hempcrete formulation by at most about 80%, 75%, 70%, 65%, 60%, 55%, 50%, 45%, 40%, 35%, 30%, 25%, 20%, 15%, 10%, 5%, 1%, 0.5%, 0.1%, or less or more by volume of the hempcrete formulation.

In some examples, the amount of hemp or its derivative in the hempcrete formulation may be substantially the same as the amount of the one or more additional materials in the hempcrete formulation.

In some cases, the present disclosure provides hempcrete formulations with low $CO_2$ footprints (e.g., a lower $CO_2$ footprint than a concrete formulation that does not comprise a hemp or a derivative thereof). Concrete is a notoriously $CO_2$ intensive substance to manufacture, and accounts for a significant portion of global greenhouse emissions. In 2018, concrete production accounted for 8% of global $CO_2$ emissions. The present disclosure provides a number of hempcrete formulations with small $CO_2$ footprints relative to those of commonly used concretes (e.g., concretes manufactured with Portland cements). In some cases, a hempcrete formulation has a $CO_2$ neutral or $CO_2$ negative footprint. In some cases, a hempcrete formulation absorbs or sequesters $CO_2$.

Concrete can be made of a cement material, and cement production requires breakdown of calcium carbonate ($CaCO_3$) into calcium oxide (CaO) and $CO_2$. Hempcrete formulations as disclosed herein uses hemp or its derivative, and thus can reduce the amount of calcium oxide needed as compared to the amount of calcium oxide needed to manufacture a concrete or a cement. Therefore, without wishing to be bound by theory, $CO_2$ emission from manufacturing a hempcrete formulation can be less than $CO_2$ emission from manufacturing a substantially equal amount (e.g., weight or volume) of a concrete formulation by at least about 0.1%, 0.5%, 1%, 5%, 10%, 15%, 20%, 25%, 30%, 35%, 40%, 45%, 50%, 55%, 60%, 65%, 70%, 75%, 80%, 90%, 100%, 200%, 500%, 1000%, or more. $CO_2$ emission from manufacturing the hempcrete formulation can be less than $CO_2$ emission from manufacturing a substantially equal amount (e.g., weight or volume) of a concrete formulation by at most about 1000%, 500%, 200%, 100%, 90%, 80%, 75%, 70%, 65%, 60%, 55%, 50%, 45%, 40%, 35%, 30%, 25%, 20%, 15%, 10%, 5%, 1%, 0.5%, 0.1%, or less.

In some cases, without wishing to be bound by theory, the hemp or its derivative within the hempcrete formulation as disclosed herein may absorb $CO_2$. Alternatively or in addition to, the hempcrete formulation as disclosed herein may comprise one or more $CO_2$-absorbing material (e.g., titanium dioxide, such as alkali-treated titanium dioxide, activated carbons, carbon fibers, silica gel, zeolites, porous silicates, activated alumina, metal-organic frameworks, etc.). The hempcrete formulation of the present disclosure can exhibit a $CO_2$-absorption capacity of at least about 0.1 nanomoles of $CO_2$ per gram of the hempcrete formulation (nmol/g), 0.5 nmol/g, 1 nmol/g, 5 nmol/g, 10 nmol/g, 50 nmol/g, 100 nmol/g, 500 nmol/g, 1 micromoles of $CO_2$ per gram of the hempcrete formulation (µmol/g), 5 µmol/g, 10 µmol/g, 50 µmol/g, 100 µmol/g, 500 µmol/g, 1 millimoles of $CO_2$ per gram of the hempcrete formulation (mmol/g), 5 mmol/g, 10 mmol/g, 50 mmol/g, 100 mmol/g, 500 mmol/g, 1 mole of $CO_2$ per gram of the hempcrete formulation (mol/g), 5 mol/g, 10 mol/g, 50 mol/g, 100 mol/g, 500 mol/g, 1000 mol/g, or more (e.g., as ascertained by subjecting a test sample to a dynamic adsorption method, in which a gas comprising synthetic air and $CO_2$ is flown through a chamber/column comprising a test sample in a controlled manner, and an amount of residual $CO_2$ in the gas that exits the chamber/column is measured by a mass spectrometer). The hempcrete formulation of the present disclosure can exhibit a $CO_2$-absorption capacity of at most about 1000 mol/g, 500 mol/g, 100 mol/g, 50 mol/g, 10 mol/g, 5 mol/g, 1 mol/g, 500 mmol/g, 100 mmol/g, 50 mmol/g, 10 mmol/g, 5 mmol/g, 1 mmol/g, 500 µmol/g, 100 µmol/g, 50 µmol/g, 10 µmol/g, 5 µmol/g, 1 µmol/g, 500 nmol/g, 100 nmol/g, 50 nmol/g, 10 nmol/g, 5 nmol/g, 1 nmol/g, 0.5 nmol/g, 0.1 nmol/g, or less.

The $CO_2$-absorption capacity of the hempcrete formulation of the present disclosure can be greater than the $CO_2$-absorption capacity of a control concrete formulation (e.g., which does not comprise hemp or a derivate thereof) by at least about 0.1%, 0.5%, 1%, 5%, 10%, 15%, 20%, 25%, 30%, 35%, 40%, 45%, 50%, 55%, 60%, 65%, 70%, 75%, 80%, 90%, 100%, 200%, 500%, 1000%, or more. The $CO_2$-absorption capacity of the hempcrete formulation of the present disclosure can be greater than the $CO_2$-absorption capacity of a control concrete formulation by at most about 1000%, 500%, 200%, 100%, 90%, 80%, 75%, 70%, 65%, 60%, 55%, 50%, 45%, 40%, 35%, 30%, 25%, 20%, 15%, 10%, 5%, 1%, 0.5%, 0.1%, or less.

In some cases, a hempcrete formulation absorbs or sequesters a greater quantity of $CO_2$ than was produced from the production of the components. An amount of $CO_2$ that is adsorbed or sequestered by the hempcrete formulation over a period of time may be greater than an amount of $CO_2$ that is produced from the production of the hempcrete formulation by at least about 0.1%, 0.5%, 1%, 5%, 10%, 15%, 20%, 25%, 30%, 35%, 40%, 45%, 50%, 55%, 60%, 65%, 70%, 75%, 80%, 90%, 100%, 200%, 500%, 1000%, or more. The amount of $CO_2$ that is adsorbed or sequestered by the hempcrete formulation over a period of time may be greater than the amount of $CO_2$ that is produced from the production of the hempcrete formulation by at most about 1000%, 500%, 200%, 100%, 90%, 80%, 75%, 70%, 65%, 60%, 55%, 50%, 45%, 40%, 35%, 30%, 25%, 20%, 15%, 10%, 5%, 1%, 0.5%, 0.1%, or less. The period of time for the adsorption or sequestration of $CO_2$ by the hempcrete formulation may be at least about 10 minutes, 30 minutes, 1 hour, 2 hours, 4 hours, 6 hours, 12 hours, 18 hours, 24 hours, 2 days, 3 days, 4 days, 5 days, 6 days, 7 days, 2 weeks, 3 weeks, 4 weeks, 2 months, 4 months, 6 months, 1 year, or more. The period of time for the adsorption or sequestration of $CO_2$ by the hempcrete formulation may be at most about 1 year, 6 months, 4 months, 2 months, 4 weeks, 3 weeks, 2 weeks, 7 days, 6 days, 5 days, 4 days, 3 days, 2 days, 24 hours, 18 hours, 12 hours, 6 hours, 4 hours, 2 hours, 1 hour, 30 minutes, 10 minutes, or less.

In some cases, a hempcrete formulation comprises partially calcined binder (e.g., partially calcined lime). In some cases, a hempcrete formulation comprises chemically calcined binder. In some cases, a hempcrete formulation comprises chemically calcined binder. In some cases, a hempcrete formulation comprises a binder sourced from gypsum, anhydrite, fluorite, apatite, or any combination thereof. In some cases, a hempcrete formulation comprises a binder sourced from cement kiln dust, lime kiln dust, fly ash, alumina process waste, bauxite, or any combination thereof. In some cases, a hempcrete formulation comprises a binder sourced from a recycled material.

In some cases, the hempcrete formulation as disclosed herein (e.g., prior to 3D printing) may exhibit a viscosity that is at least about 10,000 centipoise (cP), 20,000 cP, 50,000 cP, 80,000 cP, 100,000 cP, 200,000 cP, 500,000 cP, 800,000 cP, 1,000,000 cP, 2,000,000 cP, 5,000,000 cP, 8,000,000 cP, 10,000,000 cP, 20,000,000 cP, 50,000,000 cP, 80,000,000 cP, 100,000,000 cP, or more. The viscosity of the hempcrete formulation may be at most about 100,000,000 cP, 80,000,000 cP, 50,000,000 cP, 20,000,000 cP, 10,000,000 cP, 8,000,000 cP, 5,000,000 cP, 2,000,000 cP, 1,000,000 cP, 800,000 cP, 500,000 cP, 200,000 cP, 100,000 cP, 80,000 cP, 50,000 cP, 20,000 cP, 10,000 cP, or less.

The present disclosure provides hempcrete formulations with a range of desirable properties. In some cases, a hempcrete formulation from the present disclosure may be used to manufacture high density hempcrete. In some cases, a hempcrete formulation from the present disclosure may be used to manufacture hempcrete with high compressive strength, high flexural strength, high tensile strength, high sheer strength, or any combination therein. In some cases, a hempcrete formulation from the present disclosure may be used to manufacture hempcrete with low elasticity. In some cases, a hempcrete formulation from the present disclosure may be used to manufacture hempcrete with high elasticity. In some cases, a hempcrete formulation from the present disclosure may be used to manufacture hempcrete with low permeability. In some cases, a hempcrete formulation from the present disclosure may be used to manufacture hempcrete with high permeability. In some cases, a hempcrete formulation from the present disclosure may be used to manufacture hempcrete with a low coefficients of thermal expansion, low drying shrinkage, low specific heat, or any combination thereof. In some cases, a hempcrete formulation from the present disclosure may be used to manufacture hempcrete with a high coefficient of thermal expansion, high drying shrinkage, high specific heat, or any combination thereof. In some cases, a hempcrete formulation from the present disclosure may be used to manufacture hempcrete with a long lifespan. In some cases, a hempcrete formulation from the present disclosure may be used to manufacture a hempcrete that is resistant or inert to acid. In some cases, a hempcrete formulation from the present disclosure may be used to manufacture a hempcrete that is resistant or inert to alkaline substances. In some cases, a hempcrete formulation from the present disclosure may be used to manufacture a hempcrete that is resistant to heat transfer (i.e., is an efficient insulating material or has a high R-value). In some cases, a hempcrete formulation from the present disclosure may be used to manufacture a hempcrete with high noise-damping capacity. Hempcrete formulations of the present disclosure may have advantageous load-bearing capabilities, such as to support significant weight applied to a structure formed from such hempcrete formulations.

In some cases, R-value (e.g., in terms of ° $F \cdot ft^2 \cdot h/BTU$) of the hempcrete formulation of the present disclosure may be at least about 0.1, 0.2, 0.3, 0.4, 0.5, 0.6, 0.7, 0.8, 0.9, 1, 2, 3, 4, 5, 6, 7, 8, 9, 10, 15, 20, 30, 40, 50, or more. The R-value (e.g., in terms of ° $F \cdot ft^2 \cdot h/BTU$) of the hempcrete formulation of the present disclosure may be at most about 50, 40, 30, 20, 15, 10, 9, 8, 7, 6, 5, 4, 3, 2, 1, 0.9, 0.8, 0.7, 0.6, 0.5, 0.4, 0.3, 0.2, 0.1, or less. The R-value (e.g., in terms of ° $F \cdot ft^2 \cdot h/BTU$) of the hempcrete formulation of the present disclosure may be greater than the R-value of a control concrete formulation by at least about 0.1%, 0.5%, 1%, 5%, 10%, 15%, 20%, 25%, 30%, 35%, 40%, 45%, 50%, 55%, 60%, 65%, 70%, 75%, 80%, 90%, 100%, 200%, 500%, 1000%, or more. The R-value (e.g., in terms of ° $F \cdot ft^2 \cdot h/BTU$) of the hempcrete formulation of the present disclosure may be greater than the R-value of a control concrete formulation by at most about 1000%, 500%, 200%, 100%, 90%, 80%, 75%, 70%, 65%, 60%, 55%, 50%, 45%, 40%, 35%, 30%, 25%, 20%, 15%, 10%, 5%, 1%, 0.5%, 0.1%, or less.

In some cases, the sound reduction index (in terms of decibel of dB) of the hempcrete formulation of the present disclosure (e.g., as ascertained by measuring a reduction of a given frequency between about 100 Hertz and about 5000 Hertz across a test sample) may be at least about 0.1, 0.2, 0.5, 0.8, 1, 2, 5, 8, 10, 20, 50, 80, 100, or more. The sound reduction index (in terms of decibel of dB) of the hempcrete formulation of the present disclosure may be at most about 100, 80, 50, 20, 10, 8, 5, 2, 1, 0.8, 0.5, 0.2, 0.1, or less. The sound reduction index (in terms of decibel of dB) of the hempcrete formulation of the present disclosure may be greater than that of a control concrete formulation by at least about 0.1%, 0.5%, 1%, 5%, 10%, 15%, 20%, 25%, 30%, 35%, 40%, 45%, 50%, 55%, 60%, 65%, 70%, 75%, 80%, 90%, 100%, 200%, 500%, 1000%, or more. The sound reduction index (in terms of decibel of dB) of the hempcrete formulation of the present disclosure may be greater than that of a control concrete formulation by at most about 1000%, 500%, 200%, 100%, 90%, 80%, 75%, 70%, 65%, 60%, 55%, 50%, 45%, 40%, 35%, 30%, 25%, 20%, 15%, 10%, 5%, 1%, 0.5%, 0.1%, or less.

In some cases, a hempcrete may be self-healing. As used herein, the term "self-healing" generally refers to an ability for a material to repair structural damage or self-seal. For example, a self-healing hempcrete may be capable of sealing cracks in its structure. A hempcrete may comprise $CaCO_3$ excreting bacteria, such as *Bacillus pasteurii*. In such cases, the $CaCO_3$ excreting bacteria may be dormant until they are exposed to air. A hempcrete may comprise a material that cements upon exposure to air, including unhydrated cement (e.g., quicklime), hydrated lime, encapsulated polymers, superabsorbent polymers, or any combination thereof.

In some cases, at least about 0.1%, 0.5%, 1%, 5%, 10%, 15%, 20%, 25%, 30%, 35%, 40%, 45%, 50%, 55%, 60%, 65%, 70%, 75%, 80%, 90%, 95%, 99%, or more of a damage (e.g., crack, hole, etc.) of a hempcrete as disclosed herein may be self-healed over a period of time. At most about 100%, 99%, 95%, 90%, 80%, 75%, 70%, 65%, 60%, 55%, 50%, 45%, 40%, 35%, 30%, 25%, 20%, 15%, 10%, 5%, 1%, 0.5%, 0.1%, or less of a damage (e.g., crack, hole, etc.) of a hempcrete as disclosed herein may be self-healed over a period of time. For example, such damage as disclosed herein may be characterized by its volume. The period of time may be at least about 10 minutes, 30 minutes, 1 hour, 2 hours, 4 hours, 6 hours, 12 hours, 18 hours, 24 hours, 2 days, 3 days, 4 days, 5 days, 6 days, 7 days, 2 weeks, 3 weeks, 4 weeks, 2 months, 4 months, 6 months, 1 year, or more. The period of time may be at most about 1 year, 6 months, 4 months, 2 months, 4 weeks, 3 weeks, 2 weeks, 7 days, 6 days, 5 days, 4 days, 3 days, 2 days, 24 hours, 18 hours, 12 hours, 6 hours, 4 hours, 2 hours, 1 hour, 30 minutes, 10 minutes, or less.

3D Printing

In some cases, the present disclosure provides methods for producing three-dimensional objects which comprise hempcrete. In some cases, such methods comprise 3-dimensional (3D) printing. The 3D printing may comprise 3D printing a hempcrete formulation, as disclosed herein. In some cases, hempcrete 3D printing comprises applying a wet or semi-solid hempcrete formulation. In some cases, hempcrete 3D printing comprises applying a dry hempcrete formulation. In some cases, hempcrete 3D printing comprises applying a hempcrete powder. In some cases, hempcrete 3D printing comprises the application of a binder, sealant, resin, glue, mortar, plastic or any combination thereof. In some cases, the plastic is a hemp-based or hemp-sourced plastic. In some cases, hempcrete 3D printing comprises the application of a metal.

The 3D printing may comprise the use of a structural support, such as a mold, cast, casing, scaffold, framework, or any combination thereof. In some cases, the structural framework comprises a plastic material. In some cases, the plastic material is a hemp-based or hemp-sourced plastic. In some cases, the structural support may be 3D printed. The structural support may remain as part of the 3D object. Alternatively or in addition to, at least a portion of the structural support may be removed upon production of the 3D object.

In some cases, 3D printing may comprise the use of a 3D printer with modular functionalities. A 3D printer may be capable of printing or applying multiple types of materials. For example, a modular 3D printer may be capable of switching between printing or simultaneously printing plastic (e.g., a hemp-based plastic) and hempcrete. For example, the modular 3D printer may comprise a print head that is in fluid communication with a first source comprising the plastic and a second source comprising the hempcrete composition. The print head may comprise a single nozzle that is in fluid communication with the first source and the second source. The print head may comprise a plurality of nozzles, e.g., a first nozzle in fluid communication with the first source and a second nozzle in fluid communication with the second source. Alternatively or in addition to, the print head may comprise a nozzle, and a user may manually switch between the first source and the second source and couple either the first source or the second source in fluid communication with the nozzle of the print head. Furthermore, a 3D printer may comprise elements capable of heating, baking, milling, carving, engraving, embossing, etching, lasing, sculpting, smoothing, compressing, or any combination thereof. A 3D printer may also be capable of mixing or preparing materials. For example, a 3D printer may be capable of combining multiple compositions or materials to form hempcrete. In some cases, a 3D printer may be capable of printing a structure with minimal or no human input or guidance. In some cases, a modular printer may be capable of autonomously printing a building (e.g., a house).

In some cases, hempcrete 3D printing may produce a porous structure (e.g., a porous scaffolding of a building, wherein the void within the porous scaffolding can be filled with additional materials, such as an additional hempcrete, concrete, cement, plastic, etc.). In some cases, a porous structure may comprise circular pores. In some cases, a porous structure may comprise dodecagonal, decagonal, octagonal, hexagonal, pentagonal, square, or triangular pores, or any combination thereof. In some cases, a porous structure may comprise pores with complex shapes. In some cases, a porous structure may comprise microscopic pores. In some cases, a porous structure may comprise pores with millimeter-scale widths. In some cases, a porous structure may comprise pores with centimeter-scale widths. In some cases, a porous structure may comprise pores with decimeter-scale widths. In some cases, a porous structure may comprise pores with meter-scale widths. In some cases, a porous structure may comprise a plurality of pores with different dimensions.

In some cases, the 3D printing as disclosed herein may produce a structure that comprises a pattern of hexagonal-shaped pores (hereinafter referred to as a "honeycomb structure"). The honeycomb structure may comprise inter-pore spacings that are greater than the pore widths. The honeycomb structure may comprise inter-pore spacings that are narrower than the pore widths. The honeycomb structure may comprise a tessellation of hexagonal hempcrete bricks. A honeycomb structure may comprise flat sections, curved sections, or a combination of flat and curved sections. A honeycomb structure may comprise strength imparting structural features, such as thickened joint sections (e.g., thicker applications of hempcrete at points where three hexagonal-pore corners meet). 3D printing of hempcrete may produce any other useful structure or portion thereof. The structure may be a load-bearing structure.

Figure 2:
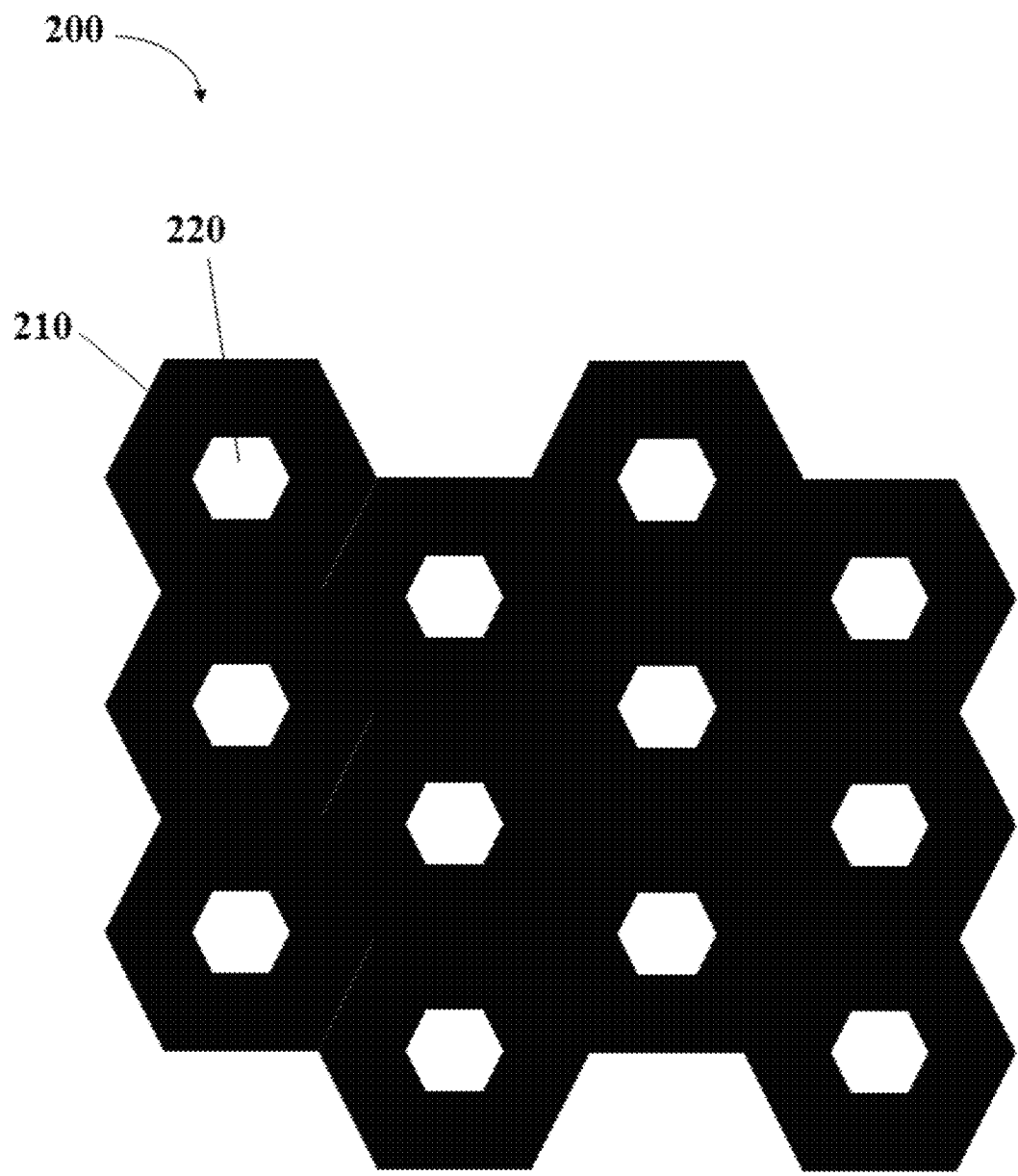
FIG. 2 schematically illustrates an example of a porous hempcrete brick.

FIG. 2 schematically illustrates a top-down view of a portion of a porous scaffolding (e.g., a portion of a porous hempcrete brick). The porous scaffolding 200 may be a honeycomb structure, comprising a solid portion 210 and a pore portion 220 comprising a hexagonal cross-section.

In some cases, hempcrete 3D printing may produce a hollow structure (e.g., a hollow scaffolding usable for constructing a building). In some cases, a cross-sectional dimension of the void within hollow structure may be dodecagonal, decagonal, octagonal, hexagonal, pentagonal, square, or triangular, or any combination thereof. In some cases, a frame of the hollow structure may be solid. Alternatively, the frame of the hollow structure may be porous, as disclosed herein.

The hollow structure as disclosed herein may comprise a void and a frame (e.g., made of the hempcrete formulation) surrounding the void. The void may take up at least about 10%, 20%, 30%, 40%, 50%, 60%, 70%, 75%, 80%, 85%, 90%, 95%, or more of the hollow structure by volume. The void may take up at most about 95%, 90%, 85%, 80%, 75%, 70%, 60%, 50%, 40%, 30%, 20%, 10%, or less of the hollow structure by volume. The void may take up at least about 10%, 20%, 30%, 40%, 50%, 60%, 70%, 75%, 80%, 85%, 90%, 95%, or more of the volume of the hollow structure than that by the frame. The void may take up at most about 95%, 90%, 85%, 80%, 75%, 70%, 60%, 50%, 40%, 30%, 20%, 10%, or less of the volume of the hollow structure than that by the frame. An average dimension (e.g., an average diameter) of the void may be at least about 0.1 millimeter (mm), 0.2 mm, 0.5 mm, 0.8 mm, 1 mm, 2 mm, 5 mm, 8 mm, 10 mm, 20 mm, 50 mm, 80 mm, 100 mm, 200 mm, 500 mm, 800 mm, 1 meter (m), 2 m, 5 m, 8 m, 10 m, 20 m, 50 m, 80 m, 100 m, or more. The average dimension (e.g., an average diameter) of the void may be at most about 100 m, 80 m, 50 m, 20 m, 10 m, 8 m, 5 m, 2 m, 1 m, 800 mm, 500 mm, 200 mm, 100 mm, 80 mm, 50 mm, 20 mm, 10 mm, 8 mm, 5 mm, 2 mm, 1 mm, 0.8 mm, 0.5 mm, 0.2 mm, 0.1 mm, or less. An average dimension (e.g., an average thickness) of the frame may be at least about 0.1 mm, 0.2 mm, 0.5 mm, 0.8 mm, 1 mm, 2 mm, 5 mm, 8 mm, 10 mm, 20 mm, 50 mm, 80 mm, 100 mm, 200 mm, 500 mm, 800 mm, 1 m, 2 m, 5 m, 8 m, 10 m, or more. The average dimension (e.g., an average thickness) of the frame may be at most about 10 m, 8 m, 5 m, 2 m, 1 m, 800 mm, 500 mm, 200 mm, 100 mm, 80 mm, 50 mm, 20 mm, 10 mm, 8 mm, 5 mm, 2 mm, 1 mm, 0.8 mm, 0.5 mm, 0.2 mm, 0.1 mm, or less. The hollow structure may an open structure, e.g., having two open faces (e.g., two open hexagonal-shaped faces) opposite each other. Alternatively, the hollow structure may be a partially-closed structure, e.g., having one open face (e.g., one open hexagonal face) and one closed face (e.g., one closed hexagonal face) that are opposite each other. Yet in another alternative, the hollow structure may be a closed structure, e.g., having two closed faces (e.g., two closed hexagonal-shaped faces) opposite each other.

Figure 3:
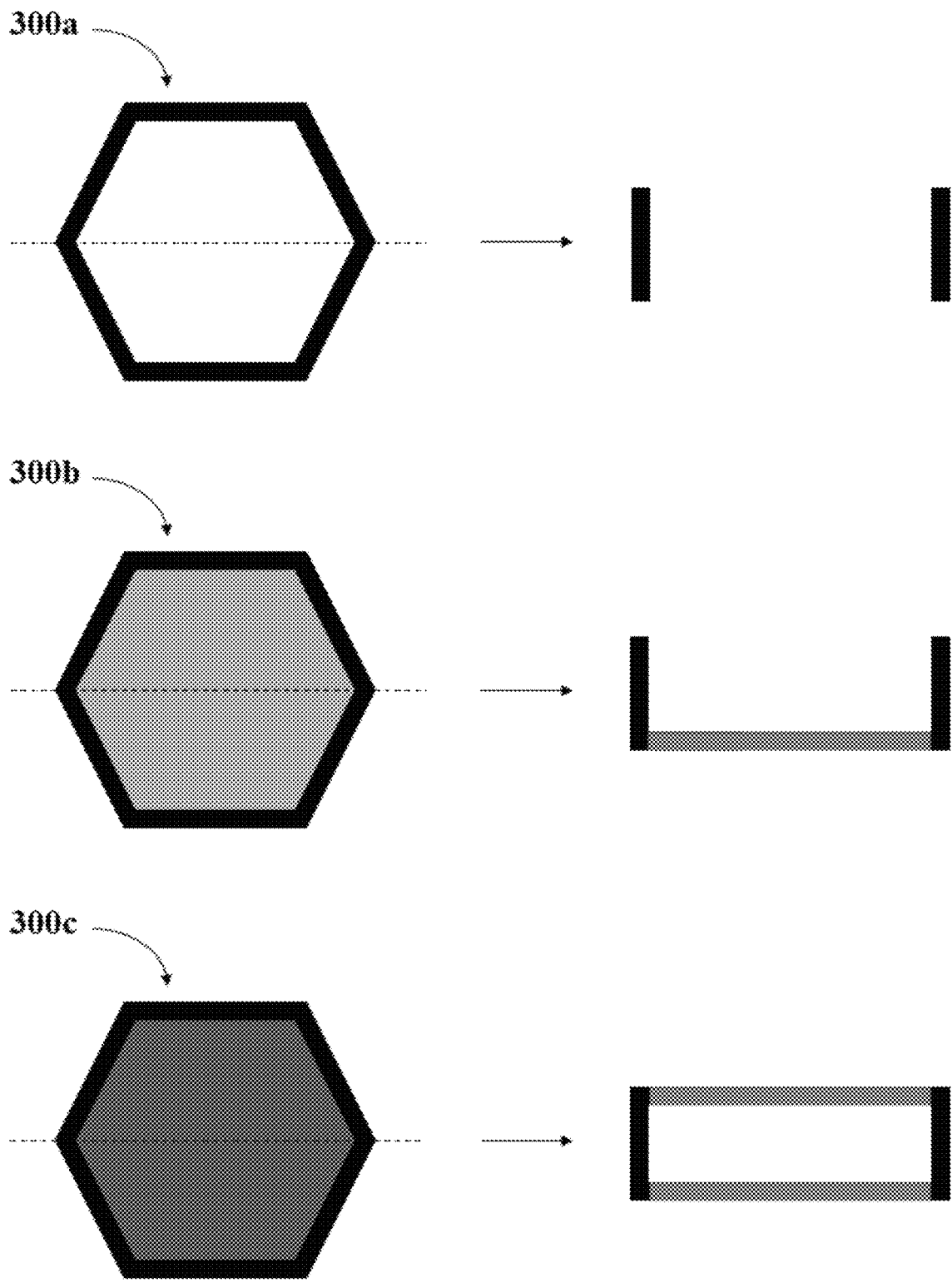
FIG. 3 schematically illustrates different examples of a hollow hempcrete brick.

FIG. 3 schematically illustrates top-down views (left of the arrow) and cross-sectional side-views (right of the arrow) of different examples of a portion of a hollow scaffolding (e.g., a hollow hempcrete brick). The hollow scaffolding 300a may comprise a hexagonal-shaped void (left), with open top and bottom faces (right). The hollow scaffolding 300b may comprise a hexagonal-shaped void (left), with an open top face and a closed bottom face (right). The hollow scaffolding 300c may comprise a hexagonal-shaped void (left), with closed top and bottom faces (right).

In some cases, hempcrete 3D printing may produce a non-hollow structure (e.g., a brick-like scaffolding for constructing a building). The non-hollow structure may be substantially-filled. The non-hollow structure may be substantially-solid. Porosity of the non-hollow structure may be less than or equal to about 40%, 35%, 30%, 25%, 20%, 15%, 10%, 9%, 8%, 7%, 6%, 5%, 4%, 3%, 2%, 1%, 0.5%, 0.1%, or less. In some cases, a cross-sectional dimension of the non-hollow structure may be dodecagonal, decagonal, octagonal, hexagonal, pentagonal, square, or triangular pores, or any combination thereof. In some cases, a cross-sectional dimension of the non-hollow structure may be a complex shape.

Figure 4:
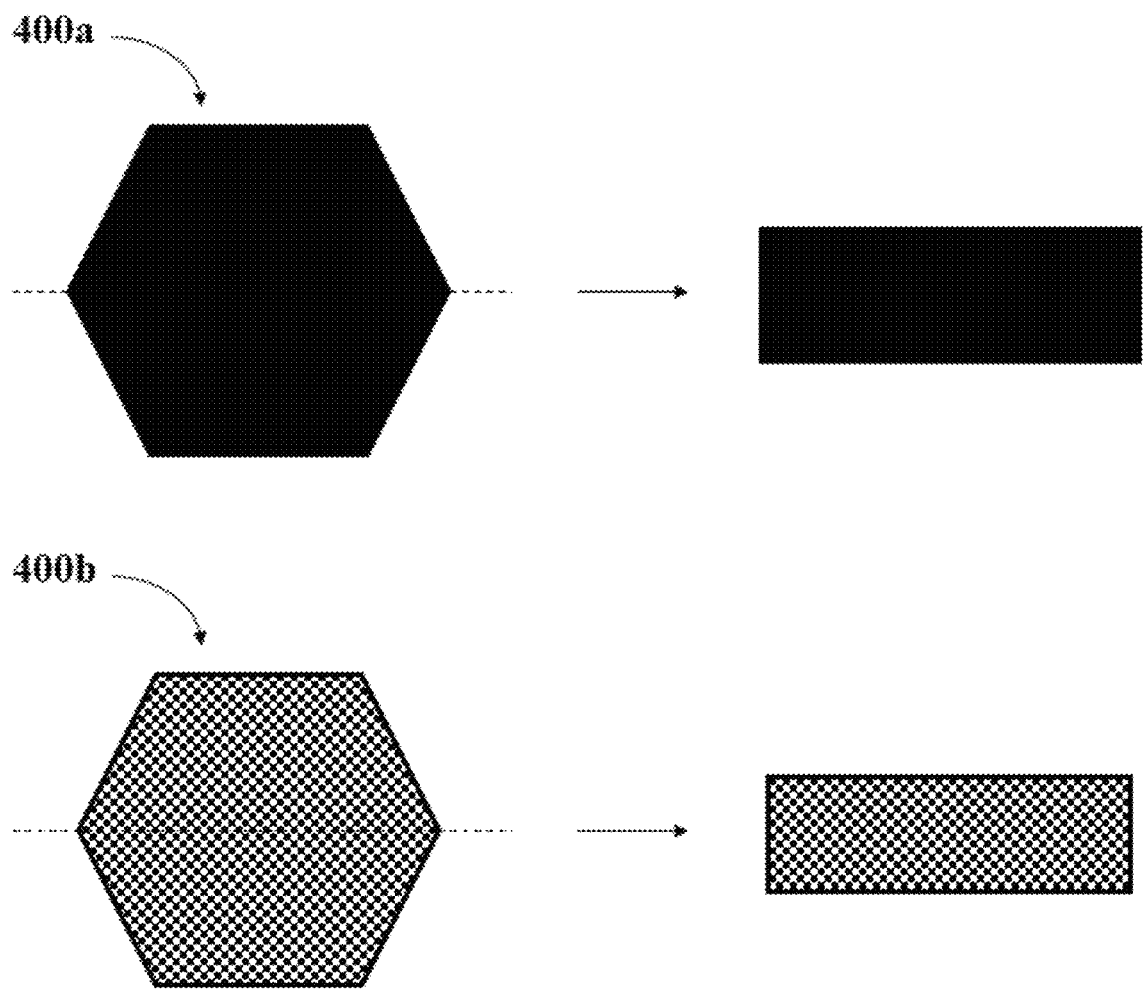
FIG. 4 schematically illustrates different examples of a non-hollow hempcrete brick.

FIG. 4 schematically illustrates top-down views (left of the arrow) and cross-sectional side-views (right of the arrow) of different examples of a portion of a non-hollow scaffolding (e.g., non-hollow hempcrete brick). The non-hollow scaffolding 400a may be a solid brick comprising a hexagonal-shaped cross-section (left). The non-hollow scaffolding 400b may be a porous brick comprising a hexagonal-shaped cross-section (left).

In some cases, a pore may be imparted during the 3D printing process by application of a separate material (e.g., a hemp-based plastic). In such cases, the separate material may be printed in the region that will later comprise the pore, and the separate material may optionally be removed after the 3D printed materials have hardened or set. For example, a hempcrete honeycomb structure may be produced by printing lines of hempcrete around solid hemp-based plastic hexagons. Alternatively, a hempcrete honeycomb structure may be produced by printing hempcrete in a desired shape (e.g., hexagonal shape) without having a guide structure of the separate material.

Figure 5:
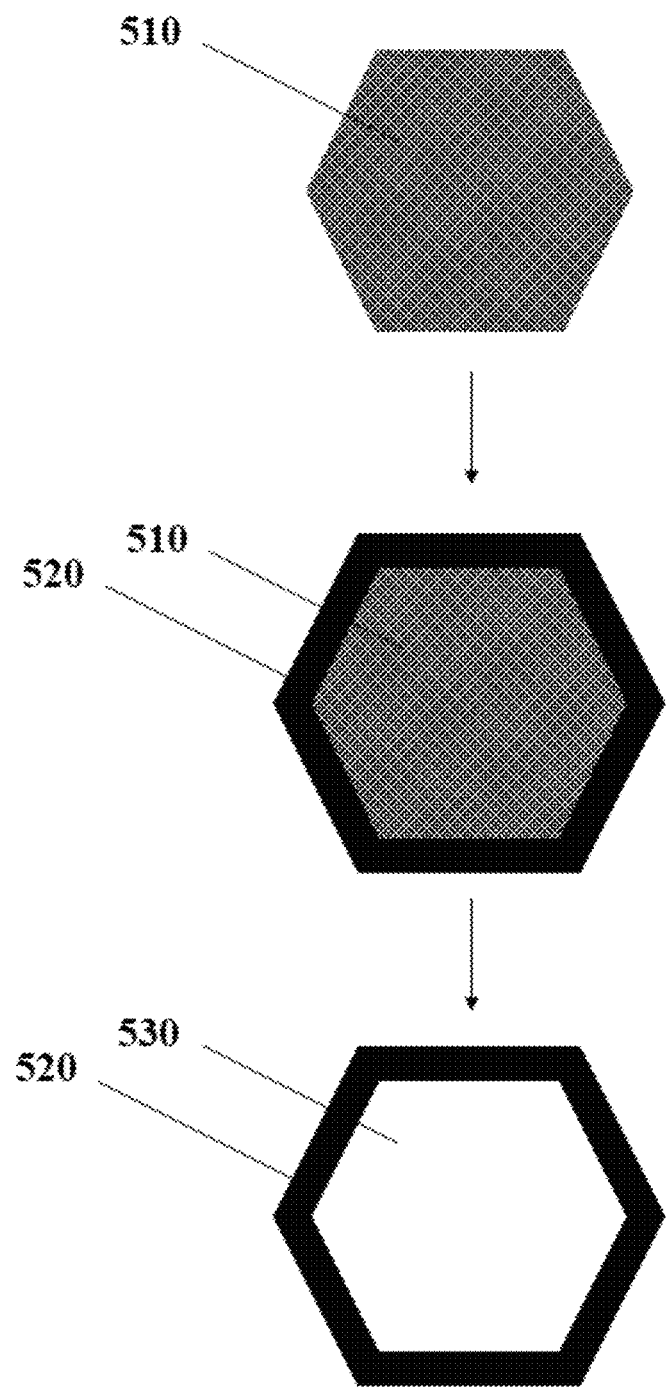
FIG. 5 schematically illustrates a process of 3D printing a hollow hempcrete brick.

FIG. 5 schematically illustrates top-down views of different steps of the 3D printing process as disclosed herein. A solid, hexagonal-shaped plastic material 510 (e.g., hemp-based plastic material) can be deposited/printed on a surface. Following, line (or lines) of a hempcrete formulation 520 can be deposited/printed around the solid, hexagonal-shaped plastic material 510. Following, the solid, hexagonal-shaped plastic material 510 can be removed, thereby leaving behind the hexagonal-shaped hempcrete layer 520 comprising a hexagonal pore/void 530 within. Alternatively, the plastic portion 510 may not be removed and may remain intact (not schematically illustrated).

In some cases, the present disclosure provides methods for 3D printing hempcrete buildings. In some cases, a method may comprise printing a building component (e.g., a wall or a hempcrete brick). For example, a method may comprise 3D printing a scaffolding of a building using hempcrete and/or a plastic (e.g., a hemp-based plastic). The scaffolding may be part of the building. Alternatively, the scaffolding may not be part of the building (e.g., at least a portion of the scaffolding may be removed upon construction of the building). In some cases, a full building may be printed. In some cases, a 3D printed building comprises hempcrete. In some cases, a building may solely comprise hempcrete. In some cases, a building may solely comprise hempcrete and plastic (e.g., a hemp-based plastic). In some cases, a building may solely comprise hemp-based materials. In some cases, a building may predominantly comprise hemp-based materials.

When the scaffolding made of hempcrete is a part of the building, an amount of the hempcrete in the building may be at least about 0.1%, 0.5%, 1%, 5%, 10%, 15%, 20%, 25%, 30%, 35%, 40%, 45%, 50%, 60%, 70%, or more by weight of the building. The amount of the hempcrete in the building may be at most about 70%, 60%, 50%, 45%, 40%, 35%, 30%, 25%, 20%, 15%, 10%, 5%, 1%, 0.5%, 0.1%, or less by weight of the building. The amount of the hempcrete in the building may be at least about 0.1%, 0.5%, 1%, 5%, 10%, 15%, 20%, 25%, 30%, 35%, 40%, 45%, 50%, 60%, 70%, or more by volume of the building. The amount of the hempcrete in the building may be at most about 70%, 60%, 50%, 45%, 40%, 35%, 30%, 25%, 20%, 15%, 10%, 5%, 1%, 0.5%, 0.1%, or less by volume of the building.

Computer Control Systems

The present disclosure provides computer control systems that are programmed to implement methods of the disclosure. FIG. 1 shows a computer control system 101 that is programmed or otherwise configured to produce a composition comprising, for example, (i) 3D printing a scaffold of a building using hempcrete, or (ii) 3D printing a hemp-based plastic material. The computer control system 101 can be implemented on an electronic device of a user or a computer system that is remotely located with respect to the electronic device. The electronic device can be a mobile electronic device.

The computer system 101 includes a central processing unit (CPU, also "processor" and "computer processor" herein) 105, which can be a single core or multi core processor, or a plurality of processors for parallel processing. The computer control system 101 also includes memory or memory location 110 (e.g., random-access memory, read-only memory, flash memory), electronic storage unit 115 (e.g., hard disk), communication interface 120 (e.g., network adapter) for communicating with one or more other systems, and peripheral devices 125, such as cache, other memory, data storage and/or electronic display adapters. The memory 110, storage unit 115, interface 120 and peripheral devices 125 are in communication with the CPU 105 through a communication bus (solid lines), such as a motherboard. The storage unit 115 can be a data storage unit (or data repository) for storing data. The computer control system 101 can be operatively coupled to a computer network ("network") 130 with the aid of the communication interface 120. The network 130 can be the Internet, an internet and/or extranet, or an intranet and/or extranet that is in communication with the Internet. The network 130 in some cases is a telecommunication and/or data network. The network 130 can include one or more computer servers, which can enable distributed computing, such as cloud computing. The network 130, in some cases with the aid of the computer system 101, can implement a peer-to-peer network, which may enable devices coupled to the computer system 101 to behave as a client or a server.

The CPU 105 can execute a sequence of machine-readable instructions, which can be embodied in a program or software. The instructions may be stored in a memory location, such as the memory 110. The instructions can be directed to the CPU 105, which can subsequently program or otherwise configure the CPU 105 to implement methods of the present disclosure. Examples of operations performed by the CPU 105 can include fetch, decode, execute, and writeback.

The CPU 105 can be part of a circuit, such as an integrated circuit. One or more other components of the system 101 can be included in the circuit. In some cases, the circuit is an application specific integrated circuit (ASIC).

The storage unit 115 can store files, such as drivers, libraries and saved programs. The storage unit 115 can store user data, e.g., user preferences and user programs. The computer system 101 in some cases can include one or more additional data storage units that are external to the computer system 101, such as located on a remote server that is in communication with the computer system 101 through an intranet or the Internet.

The computer system 101 can communicate with one or more remote computer systems through the network 130. For instance, the computer system 101 can communicate with a remote computer system of a user (e.g., a user controlling the manufacture of a three-dimensional object). Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 101 via the network 130.

Methods as described herein can be implemented by way of machine (e.g., computer processor) executable code stored on an electronic storage location of the computer system 101, such as, for example, on the memory 110 or electronic storage unit 115. The machine executable or machine readable code can be provided in the form of software. During use, the code can be executed by the processor 105. In some cases, the code can be retrieved from the storage unit 115 and stored on the memory 110 for ready access by the processor 105. In some situations, the electronic storage unit 115 can be precluded, and machine-executable instructions are stored on memory 110.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

EXAMPLES

Example 1: Construction of a Building Using 3D-Printed Hempcrete Bricks

At least a portion of a building may be constructed via 3D printed hempcrete. For example, a scaffolding of the building may be one or more 3D printed hempcrete bricks. A plurality of 3D printed hempcrete bricks can be assembled (e.g., stacked adjacent to and/or on top of one another) to build a portion (e.g., a floor, a ceiling, a wall, etc.) of the building. Non-limiting examples of the 3D printed hempcrete bricks are illustrated in FIGS. 2-4.

In some examples, any void or pores within each 3D printed hempcrete brick or between the 3D printed hempcrete bricks may be filled with an additional material (e.g., plastic, concrete, etc.). In some examples, such void or pores may not be filled with any additional material.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method, comprising three-dimensional (3D) printing a scaffolding of a building using hempcrete and an additional material, wherein said additional material comprises a hemp-based plastic.

2. The method of claim 1, wherein said additional material is printed prior to said 3D printing of said hempcrete.

3. The method of claim 2, wherein said hempcrete is 3D printed adjacent to and in contact with said additional material.

4. The method of claim 1, further comprising, subsequent to said 3D printing of said scaffolding, removing at least a portion of said 3D-printed additional material.

5. The method of claim 1, wherein an amount of hemp or a derivative thereof in said hempcrete is at least about 5% by weight of said hempcrete.

6. The method of claim 1, wherein an amount of hemp or a derivative thereof in said hempcrete is at least about 10% by weight of said hempcrete.

7. The method of claim 1, wherein an amount of hemp or a derivative thereof in said hempcrete is at least about 20% by weight of said hempcrete.

8. The method of claim 1, wherein said 3D printing comprises depositing a hempcrete formulation configured to form said hempcrete.

9. The method claim 8, further comprising producing said hempcrete formulation within a 3D printer, wherein said 3D printer is configured to perform said 3D printing.

10. The method of claim 1, wherein said scaffolding comprises a honeycomb structure, wherein said honeycomb structure is hollow or porous.

* * * * *